Dec. 2, 1958 P. B. BOTTING ET AL 2,862,276
PIPE COATING DEVICE
Filed Nov. 18, 1954 2 Sheets-Sheet 1

Percy B. Botting
Joe B. Killian
INVENTORS,

BY
Attorneys

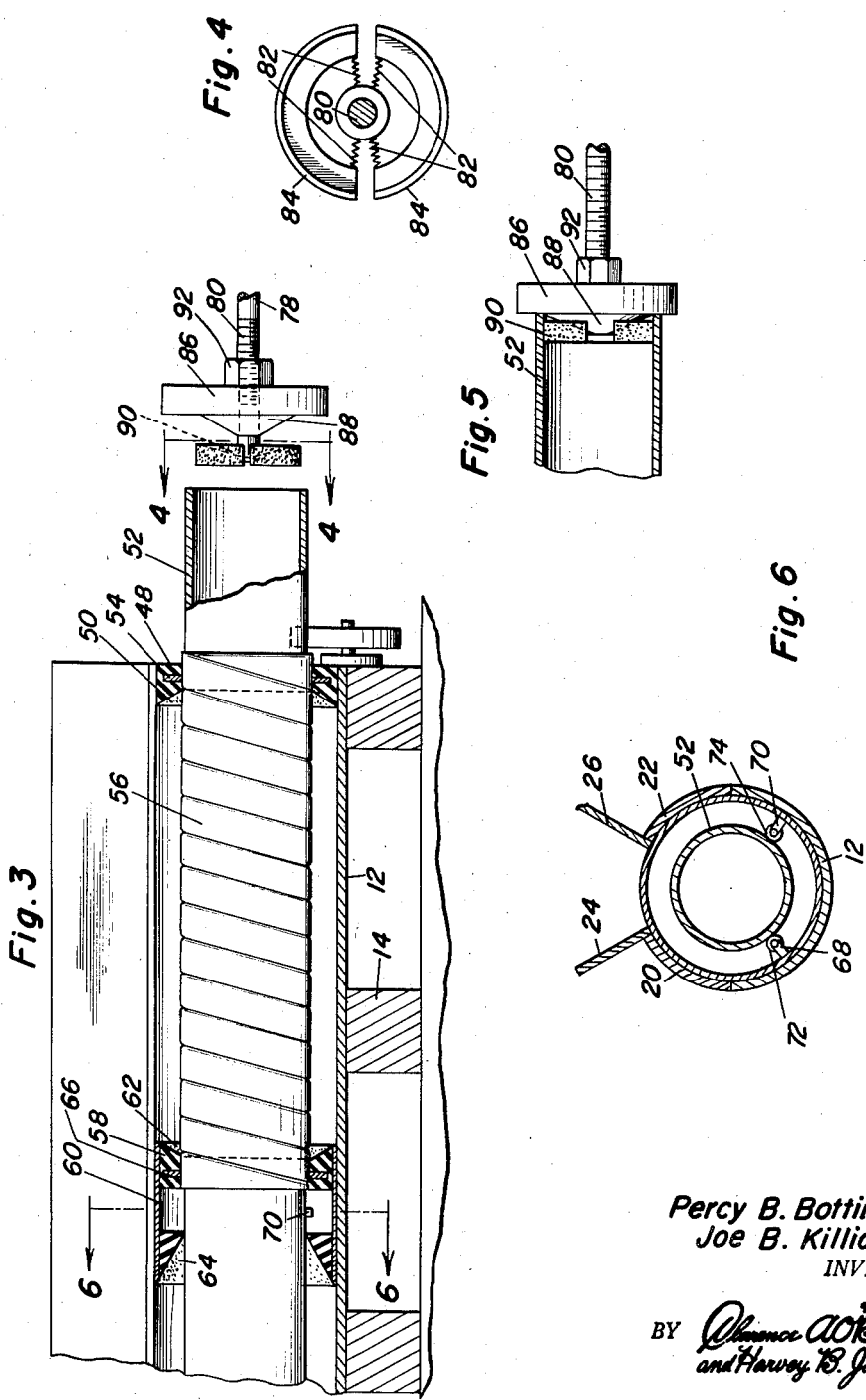

United States Patent Office 2,862,276
Patented Dec. 2, 1958

2,862,276

PIPE COATING DEVICE

Percy B. Botting and Joe B. Killian, Houston, Tex.

Application November 18, 1954, Serial No. 469,722

3 Claims. (Cl. 25—38)

This invention relates to a coating apparatus, and more particularly to a device adapted to be utilized in providing pipe with an even coat of cementitious or other plastic material in a convenient manner.

The primary object of the present invention resides in the provision of a pipe coating apparatus which may be utilized to coat pipes of various diameters and of various lengths with means being easily engageable with the individual pipe for rotating the pipe so that an even coating will be applied on the pipe.

A further object of the invention resides in the provision of a pipe coating apparatus wherein the pipe is readily supported in spaced relation to the various mold elements and in which there are provided upper mold sectors which are pivotally mounted so as to enable the uncoated or coated pipe to be easily positioned in the mold or removed therefrom.

The construction of this invention features semi-cylindrical base molds which are carried by pillars having upper mold sectors hingedly secured thereto. The upper mold sectors have their upper portions spaced from each other to form a mouth for receiving cementitious material from a hopper which moves along tracks carried by the pillars. There is provided detachable drive means for rotating a pipe positioned within the mold, and rollers are associated with the pillars for supporting the end of the pipe being coated. In addition to the foregoing, there are provided novel resilient plugs for supporting an end of the pipe within the mold at a portion where it is desired the coating should end.

Still further objects and features of this invention reside in the provision of a pipe coating device that is simple in construction, highly efficient in operation, and easy to utilize.

These, together with the various ancillary objects and features of the invention which will become apparent as the following description proceeds, are attained by this pipe coating device, a preferred embodiment of which has been illustrated in the accompanying drawings, by way of example only, wherein:

Figure 3 is a partial vertical sectional detail view of the pipe coating device;

Figure 4 is a vertical sectional detail view as taken along the plane of line 4—4 in Figure 3 and illustrating the construction of the clutch means for engagement with the inner surface of a pipe to be rotated;

Figure 5 is a sectional detail view illustrating the manner in which the clutch means engage the pipe; and Figure 6 is a sectional detail view as taken along the plane of line 6—6 of Figure 3 and illustrating the construction of the resilient plug used in the interior of the mold.

Figure 1:
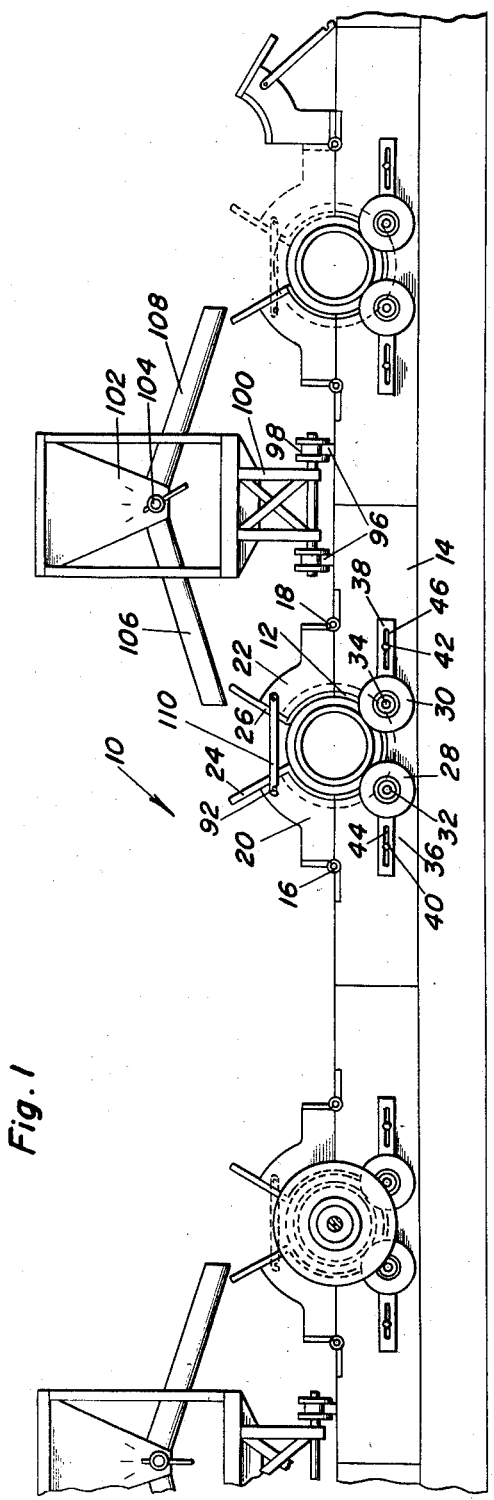
Figure 1 is an end elevational view of the invention shown with a plurality of the pipe coating apparatus arranged for successive utilization.
Figure 2:
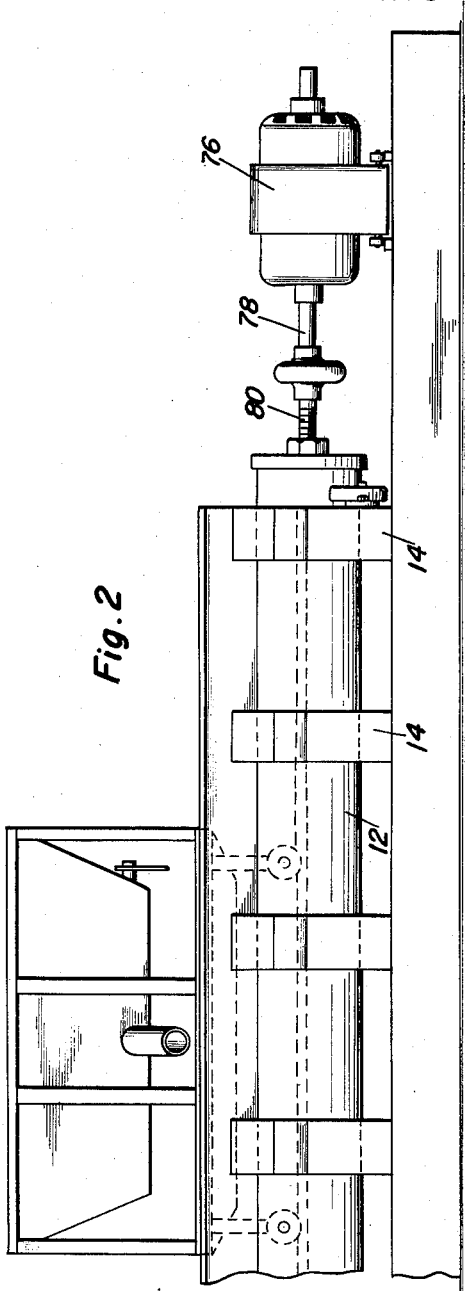
Figure 2 is a partial side elevational view of the invention.

With continuing reference to the accompanying drawings, wherein like reference numerals designate similar parts throughout the various views, reference numeral 10 is used to generally designate the pipe coating apparatus comprising the present invention which, as can be seen best in Figure 1, may be arranged so that a plurality of pipes may be successively coated in a convenient manner.

The pipe coating apparatus 10 includes a semi-cylindrical base mold 12 which is supported by a plurality of pillars 14 formed of any suitable material and which are arranged in spaced relationship along the length of the base mold 12. The pillars 14 have hingedly secured thereto, as at 16 and 18, a pair of sector molds 20 and 22 which overlie the base mold 12. The face portions 24 and 26 are provided for the sector molds, and these face portions 24 and 26 form a funnel-like mouth for the mold formed by the base mold 12 and the upper mold sectors 20 and 22.

Mounted on the end pillar 14 in an adjustable manner by any suitable means are rollers 28 and 30. It is noted that, as is shown in the drawings, the rollers 28 and 30 are mounted on shafts 32 and 34 carried by blocks 36 and 38 which are held by fasteners 40 and 42 to the pillar 14, the fasteners 40 and 42 extending through slots 44 and 46 in the blocks 36 and 38.

Referring now to Figure 3, it will be noted that the end of the mold formed by the base mold 12 and the upper mold sectors 20 and 22 is sealed by means of a resilient plug 48 positioned at the end of the mold. The plug 48 may be formed of rubber or like material and has a substantially conical-shaped recess 50 therein for forming a tapered edge in the coating as applied to a pipe 52 positioned in the mold. The plug 48 may be reinforced by a suitable split ring 54 of metal or other suitable material.

It is noted that in order to achieve proper bonding of the coating material to the pipe 52, suitable wrapping 56 may be positioned on the pipe 52.

A further plug 58 is positioned in the mold in the medial portion thereof and includes a substantially cylindrical portion 60. The cylindrical sleeve or collar 60 has the resilient portions of the plug bonded thereto and it is noted that substantially conical recesses 62 and 64 are formed in the ends of the plug 58 so as to provide a tapered coating on the pipe. The plug 58 may be suitably reinforced by a split ring 66 of metal or other reinforcing material. Suitable supports 68 and 70 are fixed to the cylindrical sleeve 60 and carry rollers 72 and 74, see Figure 6, so as to support the uncoated end of the pipe 52.

In order to rotate the pipe 52 within the mold, there may be provided any suitable type of propulsion device, such as a portable motor 76. Obviously, an electric motor, diesel motor, gasoline motor or any other suitable engine or mover can be utilized to rotate a shaft 78 which has a threaded end 80 to which there is affixed by means of springs 82 a pair of clutch members 84 which are engageable within the inner surface of the pipe 52 and which may be provided with a suitable lining as desired. Positioned on the pipe 52 is a cylindrical member 86 having a conical portion 88 engageable within the conical-shaped recess 90 in the clutch members 84. A nut 92 is threadedly secured on the threaded end 80 of the shaft 78 and is provided for moving the cylindrical member 86 and hence the conical portion 88 thereof into and out of engagement with the clutch members 84 to thereby urge them into engagement with the inner surface of the pipe 52 or to permit the retraction thereof. Obviously, this clutch arrangement can be utilized for rotating of pipes of various diameters, and it is to be recognized that different types of drives and different clutch arrangements can be utilized for driving the pipe, as desired.

Mounted on the pillars 14 are suitable tracks 96 engageable by the wheels 98 suspended from the chassis 100 of a hopper 102 which is adapted to contain the material with which the pipes 52 are to be coated. The hopper 102 is provided with a control valve 104 for permitting the contents thereof to be delivered to either of the downwardly extending chutes 106 or 108 which extend to the sides of the hopper 102 to deliver the material with which the pipes are to be coated to either of the adjacent molds.

In use, after the pipe 52 has been wrapped with a suitable wrapping 56 as may be desired and positioned in the mold formed by the base mold 12 and the upper mold sectors 20 and 22, and with the plugs 48 and 58 in position as desired, the latch 110 is engaged with the pin or other fastener 112 so that the mold sectors 20 and 22 are locked in position. Then, the motor 76 is drivingly engaged with the pipe 52 by engagement of the clutch members 84 with the inner surface of the pipe so as to rotate the pipe. A suitable coating material is then poured into the mouth formed by the spaced portions of the upper mold sectors 20 and 22 and the continuous rotation of the pipe will ensure a uniform and highly advantageous coating to the pipe 52.

It is to be recognized that the motor 76 can be detached and moved to another position for driving engagement with another pipe in a different mold and that the hopper 102, through the use of the chutes 106 and 108 may be utilized to coat adjacent pipes.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A pipe coating apparatus comprising a support, a semi-cylindrical base mold mounted on said support, upper sector mold sections hingedly secured to said support adapted to hinge outwardly from opposite sides of a length of pipe thereinto and to hinge inwardly over said base mold to form substantially a complete cylinder therewith but with the free upper edges of said upper mold sections spaced apart to define an open mouth therebetween, a pair of rollers journaled on said support at one end of said base mold for supporting one end of a pipe concentrically therewithin, an annular seal in said one end of the base mold for embracing a pipe and to extend therefrom into engagement with the inner surface of said base mold and said upper mold sections when closed, a combined seal and pipe supporting member positioned within said base mold and movable longitudinally therein to accommodate for different lengths of pipe, said seal and supporting member including an outer metallic sleeve snugly received in said base mold and clamped therein by said upper mold sections when closed, an annular sealing ring adapted to embrace a pipe and positioned within that end of the sleeve closest to the first mentioned seal, and rollers carried by the inner surface of said sleeve for engaging a pipe and holding the same concentrically within said mold, means for rotating a pipe within said mold, and means for delivering coating material into the open mouth of said mold.

2. A pipe coating apparatus comprising a support, a semi-cylindrical base mold mounted on said support, upper sector mold sections hingedly secured to said support adapted to hinge outwardly from opposite sides of a length of pipe thereinto and to hinge inwardly over said base mold to form substantially a complete cylinder therewith but with the free upper edges of said upper mold sections spaced apart to define an open mouth therebetween, a pair of rollers journaled on said support at one end of said base mold for supporting one end of a pipe concentrically therewithin, an annular seal in said one end of the base mold for embracing a pipe and to extend therefrom into engagement with the inner surface of said base mold and said upper mold sections when closed, a combined seal and pipe supporting member positioned within said base mold and movable longitudinally therein to accommodate for different lengths of pipe, said seal and supporting member including an outer metallic sleeve snugly received in said base mold and clamped therein by said upper mold sections when closed, an annular sealing ring adapted to embrace a pipe and positioned within that end of the sleeve closest to the first mentioned seal, and rollers carried by the inner surface of said sleeve for engaging a pipe and holding the same concentrically within said mold, means for rotating a pipe within said mold, and means for delivering coating material into the open mouth of said mold, the last mentioned means including a hopper assembly mounted to one side of said mold and having a discharge spout directed into said mold, and a track assembly on said support extending parallel to said mold and along which said hopper assembly is movable.

3. The assembly as defined in and by claim 1 wherein the first mentioned rollers are adjustably mounted on said support for movement toward and away from each other to accommodate for different diameter of pipe.

References Cited in the file of this patent

UNITED STATES PATENTS

| | | |
|---|---|---|
| 568,298 | Croskey et al. | Sept. 22, 1896 |
| 1,303,889 | Gruenfeld | May 20, 1919 |
| 1,873,413 | Jackson | Aug. 23, 1932 |
| 1,888,101 | Wilson | Nov. 15, 1932 |
| 1,891,764 | Henderson | Dec. 20, 1932 |
| 1,941,299 | Greenidge | Dec. 26, 1933 |
| 2,015,001 | Bishop | Sept. 17, 1935 |
| 2,119,415 | Bodge | May 31, 1938 |
| 2,269,032 | Moore | Jan. 6, 1942 |
| 2,324,760 | Brulotte | July 20, 1943 |
| 2,470,068 | Contenson | May 10, 1949 |
| 2,763,047 | Laster | Sept. 18, 1956 |